INVENTOR.
WILLIAM J. HANNAN
BY George J. Seligsohn

ATTORNEY

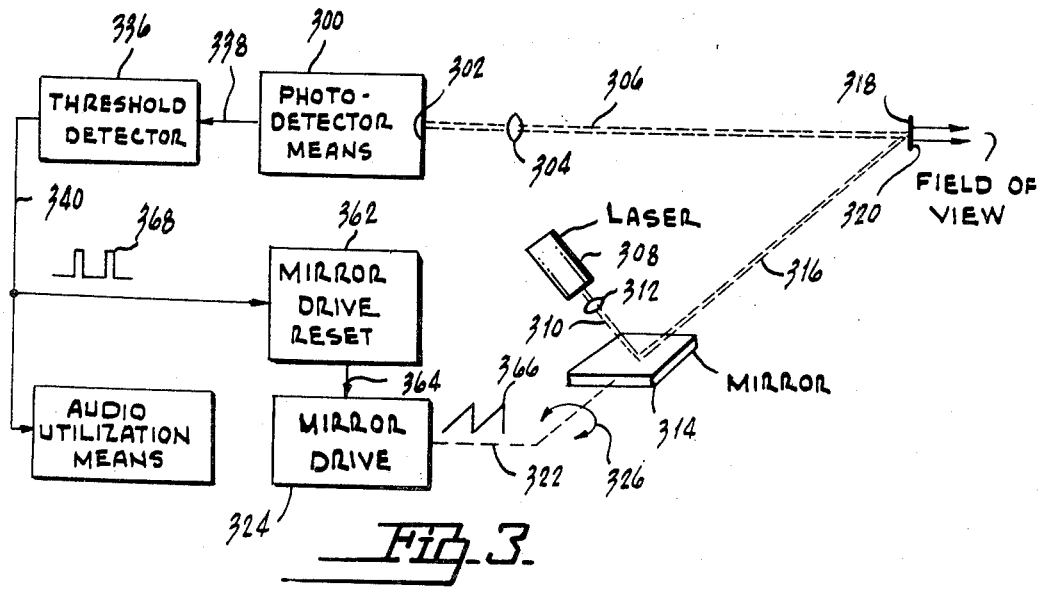

United States Patent Office 3,530,468
Patented Sept. 22, 1970

3,530,468
TRIANGULATION RADAR SYSTEM
William J. Hannan, Pennington, N.J., assignor to RCA
Corporation, a corporation of Delaware
Filed Feb. 23, 1968, Ser. No. 707,692
Int. Cl. G01s 9/04
U.S. Cl. 343—15                                   4 Claims

ABSTRACT OF THE DISCLOSURE

The disclosed triangulation radar system employs electromagnetic radiation in the light frequency spectrum from a laser to measure short ranges with great accuracy. For instance, ranges in the order of tens of feet may be measured with an accuracy of one-half foot or less. This is accomplished by locating a photodetector having a predetermined narrow field of view at a first given point, transmitting a narrow beam of laser radiation from a second point spaced a given distance from the first given point with the transmitted laser beam intersecting the field of view of the photodetector at a third point. By rotating the transmitted laser beam or field of view of the photodetector or both, the position of the third point can be changed in a manner which is determined by the instantaneous angular position of the transmitted laser beam with respect to the field of view. Laser echo signals will be received by the photodetector only when the location of a reflecting object coincides with this third point. Means are provided for measuring the range of an object, indicating this range as an audio tone, and for automatically tracking an object.

This invention relates to a triangulation radar system and, more particularly, to such a system employing electromagnetic radiation in the light frequency spectrum from a laser.

The term "light" as used herein, is not confined to visible light, but includes infrared and ultraviolet light as well.

Generally, radar systems make use of the time delay between the transmission of electromagnetic waves from a radiating source, such as an antenna, and the return thereto of an echo from an intercepted object to determine the range of the object from the radiating source. This range is proportional to the measured time delay, the proportionality constant being the known fixed velocity of electromagnetic waves, approximately 186,000 miles per second or about one foot per nanosecond. Conventional time delay radar is fine for measuring ranges to objects in the order of miles with a resolution of a small fraction of a mile. However, due to the very high velocity of electromagnetic waves, conventional time delay radar is not useful in measuring ranges to objects in the order of tens of feet with a resolution of one-half foot or less, since an error of only one nanosecond is equivalent to an error of about one-half foot.

The present invention is concerned with an optical radar which utilizes triangulation, rather than time delay, and measures short ranges with great accuracy. In order to achieve this great accuracy, the transmitted beam of electromagnetic radiation must have a much smaller divergence than is obtainable with radio frequency radiation sources or with non-coherent light frequency radiation sources. However, with the advent of the laser, which may be focused into a narrow beam having a width of only one milliradian, the advantages of triangulation radar for measuring short ranges with great accuracy can be accomplished.

There are several cases where it is highly desirable to be able to measure short ranges with a high degree of accuracy. One application, for instance, is a sensing aid for the blind. Another application, for instance, is the automatic focus of television cameras. An automatically focused television camera could be used to advantage on unmanned planetary probes where bandwidth limitations of a communication system prohibit the transmission of a real time picture that an operator at an earth-based station or a spacecraft could use to focus the television camera.

Briefly, the present invention envisages the use of photodetector means having a predetermined narrow field of view for receiving laser radar echo signals arriving substantially at a first given point from substantially solely a first direction together with means for transmitting from substantially a second given point a narrow beam of laser radiation in substantially solely a second direction which intersects the field of view of the photodetector means at a third point, whereby the first, second and third points define a triangle. The first and second given points are spaced from each other by a predetermined fixed distance, which fixes one side of this triangle. However, the angle at the first given point between this one side of the triangle and the first direction of the predetermined narrow field of view of the photodetector means and/or the angle at the second given point between this one side of the triangle and the second direction of the transmitted narrow beam of laser radiation can be varied. In other words, the position of the third point with respect to each of the first and second given points is varied. An echo in response to the transmitted narrow beam of laser radiation will be received by the photodetector means only in response to a laser radiation reflecting object being located at the third point. The triangulation laser radar system by knowing the fixed distance between the first and second given points and by knowing or measuring the aforesaid angles at the first and second given points, respectively, is capable of determining range information of the object at the third point.

It is therefore an object of the present invention to provide a triangulation laser radar system for measuring short ranges with a high degree of accuracy.

This and other objects, features and advantages of the present invention will become more apparent from the following detailed description taken together with the accompanying drawings, in which:

FIG. 3 is a third illustrative embodiment of the present invention.

Figure 1:
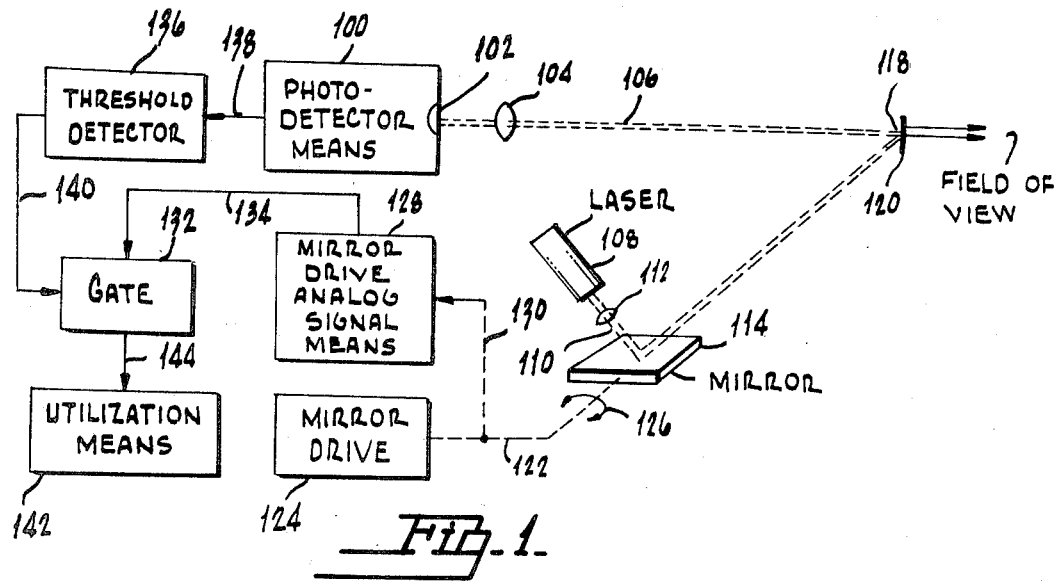
FIG. 1 is a first illustrative embodiment of the present invention.
Figure 2:
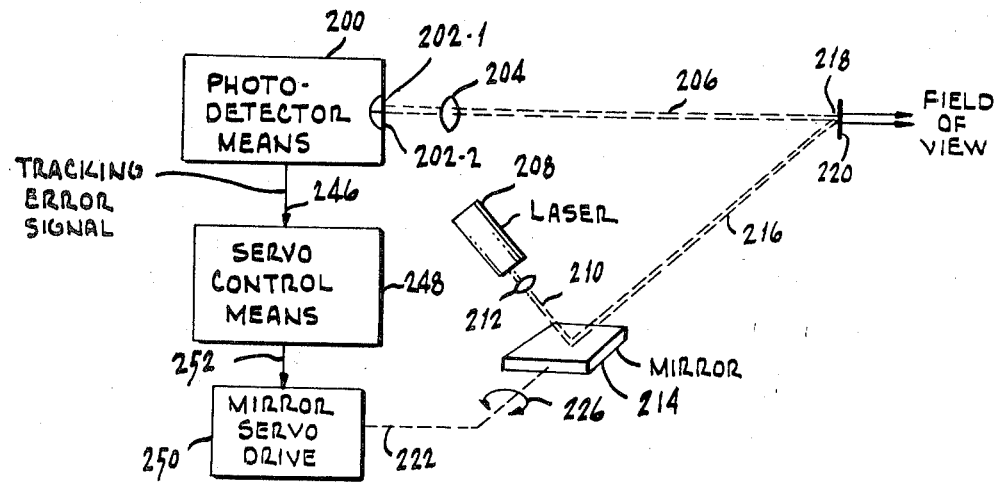
FIG. 2 is a second illustrative embodiment of the present invention.

The illustrative embodiments of the present invention shown in FIGS. 1, 2 and 3 are in no way intended to be limiting, but are meant to best teach separate features of the present invention. The different features shown in the separate illustrative embodiments of FIGS. 1, 2 and 3, respectively, are not mutually exclusive. A practical triangulation laser radar system may include one or any combination of the features illustrated in any of the various figures.

Referring now to FIG. 1, there is shown photodetector means 100 incorporating photodetector 102 in cooperative relationship with lens 104. The field of view of photodetector 102 in combination with focusing lens 104 is very narrow, and is illustrated by dotted lines 106.

Light radiation from laser 108, after being formed into narrow beam 110 by lens 112, is reflected from rotatable mirror 114 and is transmitted as light beam 116. Transmitted light beam 116, as shown, intersects field of view 106 of photodetector 102 at some point designated 118. In the angular position of rotatable mirror 114 shown in FIG. 1, object 120 coincides with intersection point 118.

Coupled to rotatable mirror 114 by linkage 122 is mirror drive 124. Mirror drive 124 is effective in rotating mirror 114 forward or backward in the direction shown by arrows 126. It will be seen that rotation of mirror 114 in a clockwise direction will cause intersection point 118 to move to the right on the far side of object 120 with respect to photodetector 102 and that rotation of mirror 114 in a counterclockwise direction will cause intersection point 118 to move to the left closer to photodetector 102 than object 120. In this manner, scanning of a given range with respect to photodetector 102 of field of view 106 takes place.

Mirror drive 124 is also coupled as an input to mirror drive analog signal means 128 by linkage 130, which provides information to mirror drive analog signal means 128 as to the instantaneous angular position of mirror 114 with respect to a predetermined angular reference. Mirror drive analog signal means 128 derives an electrical signal from the input applied thereto over linkage 130 which manifest the same information as to the instantaneous angular position of mirror 114. This electrical signal is applied as an input to normally open gate 132 over conductor 134.

Photodetector means 100 produces an electrical signal output which is a function of the amount of radiation impinging upon photodetector 102. The electrical signal output of photodetector means 100 is applied as an input to threshold detector 136 over conductor 138. Threshold detector 136 produces an output on conductor 140 only when the magnitude of the input applied thereto over conductor 138 exceeds a predetermined threshold. This prevents noise radiation impinging upon photodetector 102 from causing a signal to be applied on conductor 140. However, the energy received by photodetector 102 from echo laser radiation reflected off an object such as 120 will be of such magnitude as to produce an output from threshold detector 136 which is applied by conductor 140 as a gating signal to gate 132. In response to such a gating signal, gate 132 is momentarily closed and a sample of the mirror angle analog signal present on conductor 134 is passed through gate 132 to apply an input to utilization means 142 over conductor 144. The information provided to utilization means 142 over conductor 144 manifests the instantaneous angle of mirror 114 at the time that intersection point 118 coincides with a reflecting object, such as object 120. Utilization means 142 may include means for determining and indicating range in response to the information signal applied thereto over conductor 144, since the range of object 120 with respect to photodetector 102 is a single valued function of the mirror angle information applied to utilization means over conductor 144, and all other parameters of the triangle formed by photodetector 102, mirror 114 and object 120 are known fixed constants.

Although in the embodiment shown in FIG. 1, field of view 106 is fixed in position and only transmitted laser beam 116 is rotatable, it is clear that field of view 106 could be made rotatable instead of, or in addition to, transmitted laser beam 116. All that is important is that rotating means be provided for angularly changing the direction of the transmitted laser beam with respect to the direction of the field of view. Of course, if field of view 106 is rotated, means must be provided for providing an analog signal manifesting the instantaneous angular position of the field of view with respect to a reference.

Referring now to FIG. 2, there is shown an embodiment of the invention illustrating its target tracking capability. In FIG. 2, each of the elements designated by reference numerals 204, 206, 208, 210, 212, 214, 216, 218, 220, 222 and 226, respectively, are identical in all respects with each of the corresponding elements designated by the reference numerals 104, 106, 108, 110, 112, 114, 116, 118, 120, 122 and 126, respectively, of FIG. 1. However, photodetector means 200 of FIG. 2 differs from photodetector means 100 of FIG. 1 by including two separate contiguous photodetectors 202–1 and 202–2, respectively, rather than just a single photodetector, such as photodetector 102. Photodetector means 200 produces as an output on conductor 246 a tracking error signal which is proportional to the difference between the magnitude of the laser echo radiation impinging upon photodetector 202–1 and the magnitude of the laser echo radiation impinging upon photodetector 202–2. The tracking error signal on conductor 246 is applied as an input to servo control means 248. Servo control means 248 derives a servo control signal which is applied to mirror servo drive 250 over conductor 252. Mirror servo drive 250, in response to the servo control signal applied thereto, rotates mirror 214 through linkage 222 in that direction which results in reducing the tracking error signal on conductor 246.

Considering now the operation of the embodiment shown in FIG. 2, it will be seen that any movement of object 220 to the right will cause the relative magnitude of the laser echo radiation impinging upon photodetector 202–1 to exceed that impinging upon photodetector 202–2. In this case, a tracking error signal will be produced of the proper polarity to cause mirror servo drive 250 to turn mirror 214 to the right, thereby reducing the tracking error signal. In a similar manner any movement of object 220 to the left, will cause the relative magnitude of the laser echo radiation impinging upon photodetector 202–2 to exceed that impinging upon photodetector 202–1. In this case, a tracking error signal will be produced which will cause mirror servo drive 250 to turn mirror 214 to the left, thereby again reducing the tracking error signal.

In a practical system, the tracking features illustrated in FIG. 2 may be combined with the range acquisition features illustrated in FIG. 1. In this case, photodetector means 200 could be provided with a second output, not shown, which is proportional to the sum, rather than the difference, of the laser echo radiation impinging upon photodetectors 202–1 and 202–2, respectively. This second output of photodetector means 200 of FIG. 2 would correspond with the output of photodetector means 100 of FIG. 1. In such a combined system, a single drive would be used which would perform the function of mirror drive 124 during the acquisition of a target, such as object 120, and then would perform the function of mirror servo drive 250 during the tracking of the target once it has been acquired. Such a combined system, of course, would include elements corresponding to mirror drive analog signal means 128, gate 132, threshold detector 136 and utilization means 142 of FIG. 1.

FIG. 3 illustrates an embodiment of the invention which could be very useful as a sensing aid for the blind. In FIG. 3, each of the elements designated by the reference numerals 300, 302, 304, 306, 308, 310, 312, 314, 316, 318, 320, 322, 324, 326, 336, 338, and 340, respectively, is the same in all respects as each of the corresponding elements of FIG. 1 designated by the reference numerals 100, 102, 104, 106, 108, 110, 112, 114, 116, 118, 120, 122, 124, 126, 136, 138 and 140, respectively. However, in FIG. 3 the output of threshold detector 336 appearing on conductor 340 is applied as an input to both audio utilization means 360 and mirror drive reset 362. Mirror drive reset 362 is coupled to mirror drive 324 by linkage 364 and, in response to an input from threshold detector 336 being applied to mirror drive reset over conductor 340, causes mirror drive 324 to reset the angular position of mirror 314 to a reference angle at which intersection point 318 is at its minimum distance from photodetector 302. Mirror drive 324, after being reset, causes mirror 314 to be rotated in a direction to cause intersection point 318 to move from its minimum distance from photodetector 302 toward its maximum distance therefrom at a predetermined angular velocity. However, when intersection point 318 coincides with an object, such as object 320, laser echo radiation is received by photodetector 302, thereby causing an output pulse signal from threshold detector 336 to appear on conductor 340, which pulse signal is applied as an input to mirror drive reset 362. This results in mirror 314 again being returned to its reference angular position; whereupon the whole process is repeated.

It will be seen that a plot of the instantaneous angular position of mirror 314 against time will be a sawtooth wave, such as shown in graph 366. The repetition rate of this sawtooth wave will depend upon the range of an object such as object 320 from photodetector 302; the closer the object, the higher the repetition rate. Further, the output pulse signal from threshold detector 336, which is shown in graph 368, will occur at the same repetition rate as sawtooth 366, since this pulse signal controls the reset of mirror drive 324 and hence controls the repetition rate of the sawtooth wave.

Audio utilization means 360, which has applied as an input thereto this same output pulse signal from threshold detector 336, is responsive to the repetition rate of this pulse signal.

The speed of mirror drive 324 is such that the repetition rate of this pulse signal occurs at some audio frequency, the exact value of which is an indication of the range of an object, such as object 320, from photodetector 302. Audio utilization means 360 includes a transducer, such as headphones or a loudspeaker, for reproducing a tone at this audio frequency, which is an indication of the range of an object from photodetector 302.

The system illustrated in FIG. 3, although useful in any situation where it is desired to employ an audio tone to manifest range, is particularly useful in connection with a sensing aid for the blind.

What is claimed is:

1. A triangulation laser radar system for measuring short ranges with a high degree of accuracy, said system comprising photodetector means having a predetermined narrow field of view for receiving laser radar echo signals arriving substantially at a first given point from substantially solely a first direction, means for transmitting from substantially a second given point a narrow beam of laser radiation in substantially solely a second direction which intersects said field of view at a third point, said first and second given points being spaced from each other by a predetermined fixed distance, rotating means for changing one of said first and second directions with respect to the other to thereby vary the position of said third point with respect to each of said first and second given points, and signal translating means coupled to said photodetector means and said rotating means and simultaneously responsive to the receipt of said laser radar echo signals by said photodetector means from an object illuminated with said beam of laser radiation and to the relative orientation of said beam of laser radiation and to the relative orientation of said first and second directions for deriving an output manifesting the range of said object, wherein said first direction is fixed, wherein said transmitting means comprises a plane mirror and means including a fixedly positioned laser and lens oriented to illuminate said mirror with a narrow beam of incident radiation which upon reflection from said mirror results in a reflected beam of radiation in said second direction, wherein said rotating means includes means for pivotally mounting said mirror and means for turning said pivotally mounted mirror through a given angle, and wherein said signal translating means includes a threshold detector having its input coupled to the output of said photodetector means for producing an output from said threshold detector only when the level of the input applied thereto exceeds a predetermined threshold, sensing means coupled to said rotating means for producing a signal manifesting the instantaneous angular position of said mirror, and normally closed gate means coupled to said threshold detector and said sensing means for passing said signal only during the presence of an output from said threshold detector and said passed signal being the output of said signal translating means.

2. A triangulation laser radar system for measuring short ranges with a high degree of accuracy, said system comprising photodetector means having a predetermined narrow field of view for receiving laser radar echo signals arriving substantially at a first given point from substantially solely a first direction, means for transmitting from substantially a second given point a narrow beam of laser radiation in substantially solely a second direction which intersects said field of view at a third point, said first and second given points being spaced from each other by a predetermined fixed distance, rotating means for changing one of said first and second directions with respect to the other to thereby vary the position of said third point with respect to each of said first and second given points, and signal translating means coupled to said photodetector means and said rotating means and simultaneously responsive to the receipt of said laser radar echo signals by said photodetector means from an object illuminated with said beam of laser radiation and to the relative orientation of said first and second directions for deriving an output manifesting the range of said object, wherein said photodetector means comprises a first photodetector having a first narrow field of view and a second photodetector displaced from said first photodetector having a second narrow field of view which is contiguous with and partially overlaps said first narrow field of view, wherein said rotating means includes means including servo means for rotating said photodetector means, and wherein said signal translating means includes servo control means coupled between said photodetector means and said servo means and responsive to the difference in the outputs of said first and second photodetectors for applying a servo control signal to said servo means to effect the tracking of said object by said photodetector means.

3. A triangulation laser radar system for measuring short ranges with a high degree of accuracy, said system comprising photodetector means having a predetermined narrow field of view for receiving laser radar echo signals arriving substantially at a first given point from substantially solely a first direction, means for transmitting from substantially a second given point a narrow beam of laser radiation in substantially solely a second direction which intersects said field of view at a third point, said first and second given points being spaced from each other by a predetermined fixed distance, rotating means for changing one of said first and second directions with respect to the other to thereby vary the position of said third point with respect to each of said first and second given points, and signal translating means coupled to said photodetector means and said rotating means and simultaneously responsive to the receipt of said laser radar echo signals by said photodetector means from an object illuminated with said beam of laser radiation and to the relative orientation of said first and second directions for deriving an output manifesting the range of said object, wherein said rotating means includes means for rotating one of said first and second directions with respect to each other in a given sense at a given rate from a predetermined initial condition, and wherein said signal translating means includes first means coupled to said rotating means for producing a signal output manifesting the instantaneous condition of said one of said first and second directions with respect to said initial condition thereof and second means coupling said photodetector means to said rotating means for effecting the return of said one of said first and second directions to said initial condition thereof in response to the receipt of said laser echo radar signals from said object, whereby the repetition rate of said signal output is a function of the range of said object.

4. The system defined in claim 3, wherein said given rate is such that said repetition rate constitutes an audio frequency.

References Cited
UNITED STATES PATENTS

| | | | |
|---|---|---|---|
| 2,763,856 | 9/1956 | Lattmann | 343—15 XR |
| 3,181,155 | 4/1965 | Huckabay et al. | 343—15 |
| 3,194,966 | 7/1965 | Hulett | 250—203 |
| 3,290,506 | 12/1966 | Bertram | 250—203 |
| 3,317,731 | 5/1967 | Webb | 250—203 |
| 3,352,223 | 11/1967 | Garra | 356—1 XR |
| 3,356,848 | 12/1967 | Heyck | 250—203 |
| 3,360,987 | 1/1968 | Flower et al. | 356—5 XR |

RODNEY D. BENNETT, JR., Primary Examiner

J. P. MORRIS, Assistant Examiner

U.S. Cl. X.R.

356—1, 5